United States Patent
Yoo

(10) Patent No.: US 8,463,101 B2
(45) Date of Patent: Jun. 11, 2013

(54) METHOD AND APPARATUS FOR RECORDING AND REPRODUCING MOTION PICTURE WITH LOCATION INFORMATION

(75) Inventor: Sang Hun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 12/485,392

(22) Filed: Jun. 16, 2009

(65) Prior Publication Data

US 2009/0310938 A1    Dec. 17, 2009

(30) Foreign Application Priority Data

Jun. 17, 2008    (KR) .................. 10-2008-0057051

(51) Int. Cl.
*H04N 5/77*    (2006.01)
(52) U.S. Cl.
USPC ............................ 386/227; 386/325; 386/362
(58) Field of Classification Search
USPC ......................................... 386/227, 325, 362
See application file for complete search history.

(56) References Cited

U.S. PATENT DOCUMENTS

| | | | | |
|---|---|---|---|---|
| 6,157,770 | A * | 12/2000 | Sakamoto | 386/314 |
| 6,476,874 | B1 * | 11/2002 | Ito et al. | 348/586 |
| 6,741,790 | B1 | 5/2004 | Burgess | |
| 7,627,227 | B2 * | 12/2009 | Evans et al. | 386/347 |
| 2003/0182170 | A1 * | 9/2003 | Meunitz | 705/9 |
| 2004/0119868 | A1 * | 6/2004 | Kim | 348/333.01 |
| 2004/0174443 | A1 | 9/2004 | Simske | |
| 2004/0221227 | A1 * | 11/2004 | Wu | 715/512 |
| 2005/0170859 | A1 * | 8/2005 | Koike et al. | 455/550.1 |
| 2005/0213945 | A1 | 9/2005 | Ohiro et al. | |
| 2006/0007298 | A1 * | 1/2006 | Takeuchi et al. | 348/14.13 |
| 2006/0172773 | A1 * | 8/2006 | Morishita et al. | 455/560 |
| 2007/0051793 | A1 | 3/2007 | Katoh et al. | |
| 2007/0224977 | A1 * | 9/2007 | Yamaguchi et al. | 455/414.2 |
| 2008/0200154 | A1 * | 8/2008 | Maharajh et al. | 455/414.3 |
| 2009/0264149 | A1 * | 10/2009 | Miller et al. | 455/552.1 |

FOREIGN PATENT DOCUMENTS

| | | |
|---|---|---|
| EP | 2 090 989 A1 | 8/2009 |
| WO | 2008/068990 A1 | 6/2008 |

* cited by examiner

*Primary Examiner* — Thai Tran
*Assistant Examiner* — Jose Mesa
(74) *Attorney, Agent, or Firm* — Jefferson IP Law, LLP

(57) ABSTRACT

A method and apparatus for recording and reproducing a motion picture with location information are provided. The method for reproducing the motion picture includes acquiring, when a request for playing a motion picture is detected, current location information of the mobile terminal using location data, retrieving location information included in the motion picture, comparing the current location information and the retrieved location information, and reproducing, when the current location information and the retrieved location information are substantially identical with each other, the motion picture.

27 Claims, 4 Drawing Sheets

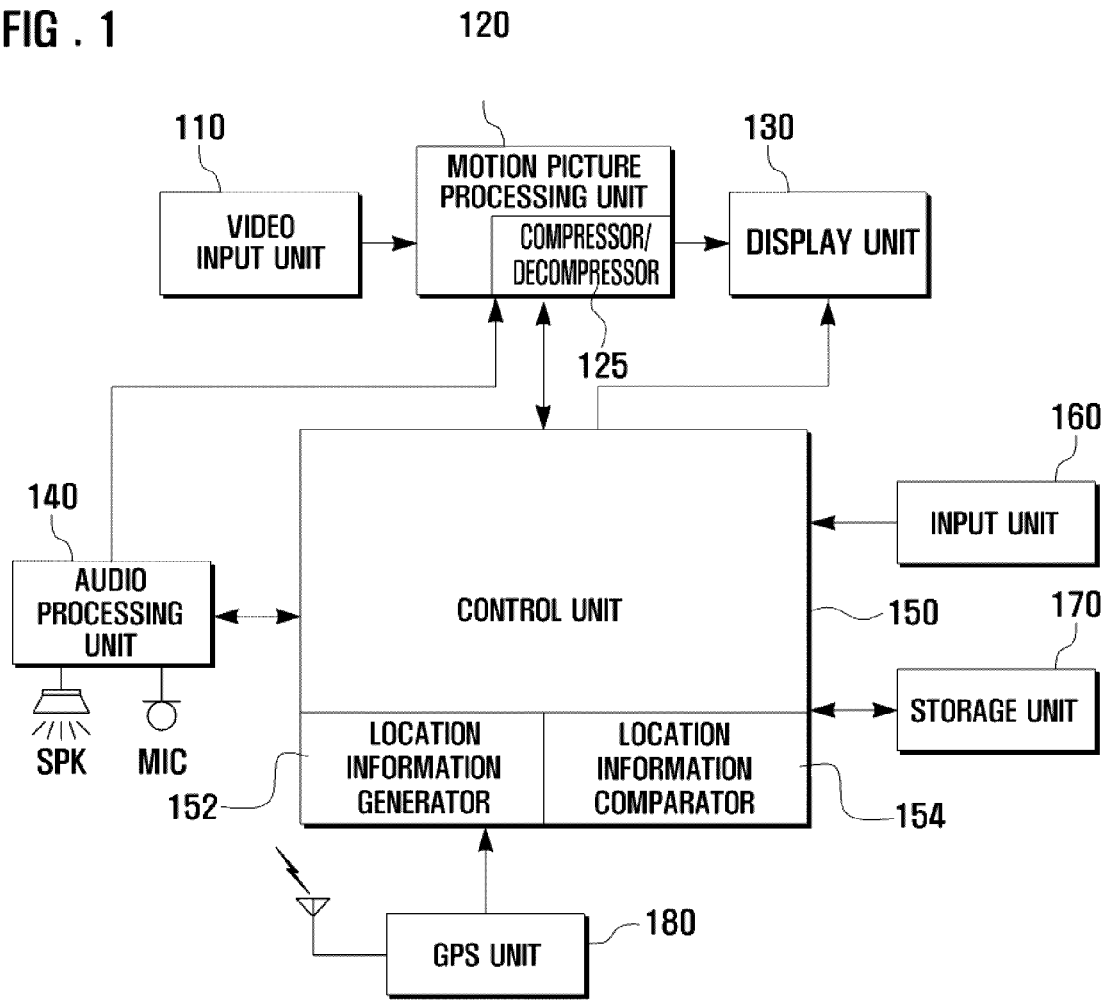

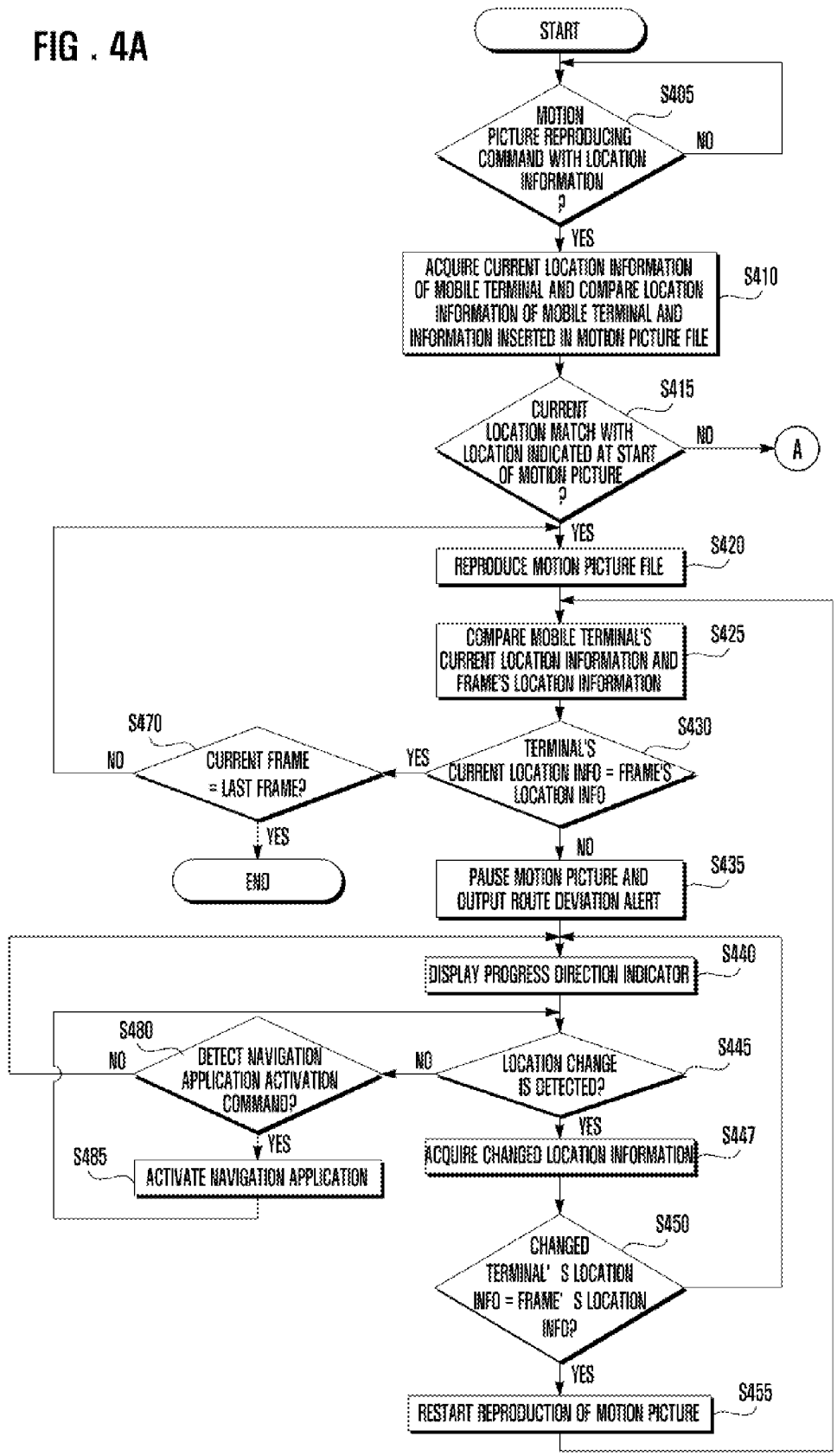

METHOD AND APPARATUS FOR RECORDING AND REPRODUCING MOTION PICTURE WITH LOCATION INFORMATION

PRIORITY

This application claims the benefit under 35 U.S.C. §119(a) of a Korean patent application filed in the Korean Intellectual Property Office on Jun. 17, 2008 and assigned Serial No. 10-2008-0057051, the entire disclosure of which is hereby incorporated by reference.

BACKGROUND OF THE INVENTION

1. Field of the Invention

The present invention relates to a motion picture recording and reproduction. More particularly, the present invention relates to a method and apparatus for recording and reproducing a motion picture with location information.

2. Description of the Related Art

With the advance of technologies, a mobile terminal is becoming a multifunctional device. For instance, a recent mobile terminal is provided with a camera module and image editing applications for a user to take and edits photos, a Moving Picture Experts Group (MPEG)-1 Audio Layer 3 (MP3) module for playing MP3 files, a Global Positioning System (GPS) module for determining the user location, etc. Recently, a camera-enabled mobile terminal has evolved to support capturing motion pictures. A motion picture includes a series of individual images called frames that are rapidly shown in succession such that the viewer has the illusion that motion is occurring, i.e. persistence of vision. When the images are shown consecutively at a rate of 24 to 30 frames per second, the viewer cannot see the inherent flickering between frames due to the effect of persistence of vision. Since the motion picture running at a rate of 24 to 30 frames per second has a large amount of data, video data are stored in a compressed format for later reproduction.

Meanwhile, a GPS module of the mobile terminal is used to receive GPS data transmitted by GPS satellites. The GPS module determines the current location of the mobile terminal using the GPS data, whereby the GPS module may be used for the purpose of showing an accurate position and navigating a user to a destination on a map.

In case of using the mobile terminal equipped with both the camera module and the GPS module, the user is likely to experience a lack of cooperative advantage of these useful functions. For instance, a traveler carrying the mobile terminal supporting the camera function and the GPS function may want to record travel sites through which the user passes together with motion pictures and location information for the user's next visit or other travelers' guidance information. However, a conventional mobile terminal does not provide cooperative use of the camera function and the GPS function. Accordingly, there is a need for a method for recording a motion picture composed of frames having location information and reproducing the recorded motion picture with location information.

SUMMARY OF THE INVENTION

An aspect of the present invention is to address at least the above-mentioned problems and/or disadvantages and to provide at least the advantages described below. Accordingly, an aspect of the present invention is to provide a method and apparatus for recording and reproducing a motion picture with location information.

In accordance with an aspect of the present invention, a motion picture recording method of a mobile terminal is provided. The method includes starting recording of video data in response to a motion picture recording command, receiving location data simultaneously with recording the video data, acquiring location information of the mobile terminal using the location data, and generating video frames having the video data and the location information. In an exemplary implementation, generating video frames includes attaching the location information at the end of the video data. In an exemplary implementation, generating a video frame includes inserting auxiliary video information into the video frame in response to a preset command. In an exemplary implementation, the auxiliary video information is at least one of motion or still pictures related to options selectable in response to a command. In an exemplary implementation, generating video frames includes receiving the location data periodically while generating the video frames, determining location of the mobile terminal continuously using the location data, detecting a location change of the mobile terminal by comparing continuously determined locations, and inserting, when a location change of the mobile terminal is detected, location information on the changed location into a current video frame. In an exemplary implementation, the location data are received from Global Positioning System (GPS) satellites. In an exemplary implementation, starting recording of video data includes converting light input through a camera lens into a digital video signal, and processing the digital video signal in unit of video frame. In an exemplary implementation, generating video frames includes generating, when a location change of the mobile terminal is not detected, the video frames without the location information. In an exemplary implementation, the video frames are compressed in at least one compression format of Moving Picture Experts Group (MPEG)-1, MPEG-2, MPEG-4, H.263, and H.264. In an exemplary implementation, the motion picture recording method further includes storing the video frames as a motion picture file.

In accordance with another aspect of the present invention, a motion picture reproduction method of a mobile terminal is provided. The method includes acquiring, when a request for playing a motion picture is detected, current location information of the mobile terminal using location data, retrieving location information included in the motion picture, comparing the current location information and the retrieved location information, and reproducing, when the current location information and the retrieved location information are substantially identical with each other, the motion picture. In an exemplary implementation, reproducing the motion picture includes acquiring the location information of the mobile terminal with the location data received from Global Positioning System (GPS) satellites periodically while reproducing the motion picture, determining whether current location information of the mobile terminal and the retrieved location information of the motion picture are substantially identical with each other, pausing, when the current location information and the retrieved location information are different from each other, reproduction of the motion picture, and displaying a progress direction indicator on the paused motion picture. In an exemplary implementation, reproducing the motion picture includes displaying auxiliary video information related to selectable options for helping select a direction to progress with the progress direction indicator. In an exemplary implementation, the progress direction indicator indicates one of forward, rightward, and leftward directions. In an exemplary implementation, reproducing the motion picture includes maintaining/restarting, when the current location information and the retrieved location information are substantially identical with each other, reproduction of the motion picture. In an exemplary implementation, pausing the reproduction of the motion picture includes activating a navigation application in response to a command.

In accordance with yet another aspect of the present invention, a motion picture recording apparatus for a mobile terminal is provided. The apparatus includes a video input unit which input video signals through a camera lens, a Global Positioning System (GPS) unit which receives location data periodically, a motion picture processing unit which generates video frames with the video signals and location information acquired from the location data, and a control unit which controls recording a motion picture composed of the video frames with the location information. In an exemplary implementation, the control unit includes a location information generator which generates the location information of the mobile terminal using the location data received by the GPS unit, and a location information comparator which compares previous location information and current location information to detect a location change of the mobile terminal. In an exemplary implementation, the motion picture processing unit attaches the location information at an at least one of the video frames. In an exemplary implementation, the motion picture processing unit includes a compressor/decompressor which compresses/decompresses the video frames with the location information. In an exemplary implementation, the compressor/decompressor compresses the video frames in which no location change of the mobile terminal is detected without location information. In an exemplary implementation, the compressor/decompressor compresses the video frames in at least one compression format of Moving Picture Experts Group (MPEG)-1, MPEG-2, MPEG-4, H.263, H.264, and the like. In an exemplary implementation, the motion picture recording apparatus further includes a storage unit which stores the video frames as a motion picture file in a compressed format and progress direction indicators in the form of a table.

In accordance with still another aspect of the present invention, a motion picture reproduction apparatus for a mobile terminal is provided. The apparatus includes a Global Positioning System (GPS) unit which receives location data periodically, a control unit which acquires current location information of the mobile terminal using the location data in response to a command requesting reproduction of a motion picture file, retrieves location information included in the motion picture file, compares the current location information and the retrieved location information, and starts reproduction of the motion picture file when the current location information and the retrieved location information are substantially identical with each other, and a display unit which displays video data reproduced from the motion picture file. In an exemplary implementation, the control unit pauses, when the current location information of the mobile terminal and the retrieved location information are different from each other, the reproduction of the motion picture file. In an exemplary implementation, the display unit displays, when the current location information of the mobile terminal and the retrieved location information are different from each other, a progress direction indicator for guiding a direction to progress at the location whether the motion picture has paused. In an exemplary implementation, the display unit displays auxiliary video information related to selectable options with the progress direction information for helping select a direction to progress with the progress direction information. In an exemplary implementation, the progress direction indicator indicates one of forward, rightward, and leftward directions. In an exemplary implementation, the control unit acquires, when a location change of the mobile terminal is detected after the pause of the motion picture, the location information of the mobile terminal after the location change and restarts reproduction of the motion picture. In an exemplary implementation, the control unit activates a navigation application in response to a command input during pause of the motion picture.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 is a block diagram illustrating a configuration of a mobile terminal capable of recording and reproducing a motion picture with location information according to an exemplary embodiment of the present invention;

FIG. 2 is a diagram illustrating a data structure of a motion picture file including location information according to an exemplary embodiment of the present invention;

FIGS. 4A and 4B are flowcharts illustrating a method for reproducing a motion picture with location information according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 3:
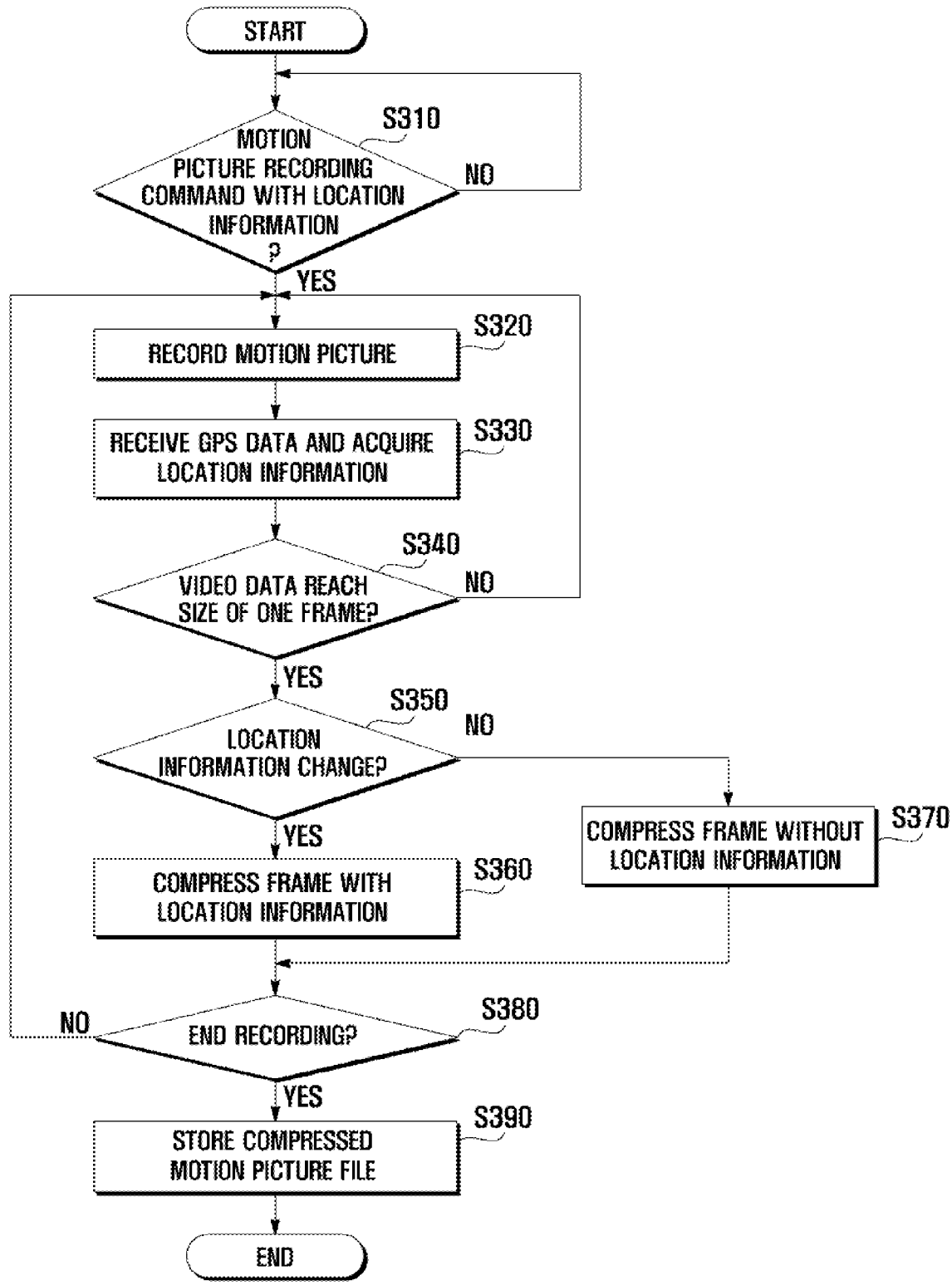
FIG. 3 is a flowchart illustrating a method for recording a motion picture with location information according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

FIG. 1 is a block diagram illustrating a configuration of a mobile terminal capable of recording and reproducing a motion picture with location information according to an exemplary embodiment of the present invention. As an exemplary implementation, FIG. 1 is depicted with function blocks required for recording and reproducing the motion picture with location information, but other function blocks may be included for achieving other basic functions of the mobile terminal such as voice/video communication.

Referring to FIG. 1, the mobile terminal includes a video input unit 110, a motion picture processing unit 120, a display unit 130, an audio processing unit 140, a control unit 150, an input unit 160, a storage unit 170, and a GPS unit 180. The motion picture processing unit 120 includes a compressor/decompressor 125, and the control unit 150 includes a location information generator 152 and a location information comparator 154.

Referring to FIG. 1, the video input unit 110 converts light input through a camera lens into a digital video signal. The video input unit 110 includes a camera lens, a Charge Coupled Device (CCD), an Analog-to-Digital Converter (ADC), and the like. The CCD converts an image captured through a camera lens into an analog electric signal (optic-to-electronic transformation) and outputs a video signal having an appropriate time (e.g. 1/15 seconds) and size (e.g. 640×480 resolution). The video signal output by the CCD is processed by a pre-processing circuit to remove noise and adjust white balance and then converted into a digital video signal by the ADC. The audio processing unit 140 converts an audio signal into an analog audio signal and outputs the analog signal through a speaker SPK and converts the analog audio signal input through a microphone MIC into a digital audio signal. The images constituting a motion picture are captured through the camera lens, and the sound, i.e. the audio signal, is captured through the microphone MIC. The audio processing unit 140 is provided with an amplifier AMP for amplifying the analog audio signal by a predetermined gain and an ADC for converting the amplified analog audio signal into a digital audio signal. The motion picture processing unit 120 process the digital video signal input from the video input unit 110 to output video data. The motion picture processing unit 120 processes the video signal frame by frame and outputs the frame video signal in a format appropriate for the display unit 130. The motion picture processing unit 120 is provided with a compressor/decompressor 125 such that the compressor/decompressor 125 compresses digital video and audio data representing the motion picture in a predetermined compression scheme to output as a compressed motion picture data and decompresses the compressed motion data to recover the digital video and audio data. Here, the digital audio data can be compressed according to an audio compression standard such as MP3, Windows Media Audio (WMA), and the like, and the digital video data can be compressed according to a video compression standard such as MPEG-1, MPEG-2, MPEG-4, H.263, H.264, and the like. As an exemplary implementation, the description is directed to the compression/decompression of the digital video data including location information using the MPEG-4 standard. However, the compression/decompression is not limited to the MPEG-4 standard, but other video compression standards may be adopted for compressing/decompressing the video data together with one of the aforementioned audio compression standard for compressing the digital audio data. More particularly, in an exemplary implementation, the compressor/decompressor 125 is configured to compress/decompress the video data with the location information generated by the location information generator 152 of the control unit 150. The video data including the location information has a frame format as illustrated in FIG. 2. More detailed description of the frame format of the video data including the location information is described later with reference to FIG. 2. Although it is integrated in the motion picture processing unit 120 in FIG. 1, the compressor/decompressor 125 can be arranged independently or integrated in the control unit 150.

The control unit 150 controls operations of the mobile terminal. The control unit 150 includes a location information generator 152 for generating the location information using the location data and time information provided by the GPS unit 180 and a location information comparator 154 for comparing the previous location information and the current location information of the mobile terminal or the location information of the currently playing video file and the current location information of the mobile terminal to select a progress direction indicator. The display unit 150 displays user data output by the control unit 150. The display unit 150 may be implemented with a Liquid Crystal Display (LCD). In the case that the LCD supports a touchscreen function, the display unit 150 serves as a part of the input unit 160. The input unit 160 is provided with a plurality of alphanumeric keys for receiving alphanumeric data and function keys for setting and executing diverse functions of the mobile terminal. The storage unit 170 includes a program memory and a data memory. The program memory stores application programs for executing diverse functions of the mobile terminal. The data memories store the application data generated while corresponding application programs run. The storage unit 170 also stores the video data including the compressed location information and a table containing the movement direction indicator information. The GPS unit 180 receives the time and location information from the GPS satellites periodically. The GPS unit 180 determines the location of the mobile terminal using the time and location information according to a well-known method, thereby omitting the detailed description on how to determine the location. There are many methods for determining the location of the mobile terminal. In an exemplary implementation, a standalone GPS mode is used for obtaining the GPS data. In the standalone mode, the mobile terminal uses the navigation data to search for the GPS satellites and determines its location with the signals directly received from multiple satellites.

FIG. 2 is a diagram illustrating a data structure of a motion picture file including location information according to an exemplary embodiment of the present invention.

Referring to FIG. 2, a motion picture file composed of a plurality of frames can be provided in the form of a bit stream. FIG. 2 illustrates an exemplary motion picture file including N frames, i.e. frame 1 to frame N. Each frame may include a frame header field containing frame information and a data field containing data. In a case that the location of the mobile terminal changes while recording motion pictures, a location information (GPS Info) field is added at the end of the frame. The location information field can be added to every frame or the frame during which the location change is detected for saving storage space. In more detail, the video data input through the video input unit 110 (see FIG. 1) are compressed frame by frame while the GPS module 180 determines the location of the mobile terminal using the information received from the GPS satellites. When the change of the location is detected, the location information field is added to the end of the frame. In this manner, the motion picture file having the location information is created as illustrated in FIG. 2. In an exemplary motion picture file of FIG. 2, the frame 1, frame 3, frame 4, and frame N have the location information fields, respectively. The procedure for recording video data with location information is described hereinafter with reference to FIG. 3.

FIG. 3 is a flowchart illustrating a method for recording a motion picture with location information according to an exemplary embodiment of the present invention.

Referring to FIG. 3, the control unit 150 first determines whether a motion picture recording command is detected at step S310. If a motion picture recording command is detected, the control unit 150 controls the video input unit 110 to record a motion picture at step S320. That is, the video input unit 110 captures the images input through a camera lens. The motion picture recording command is generated by key input through the input unit 160 such that, when a key signal generated by a specific key is detected, the control unit 150 determines that the motion picture recording command is input. Next, the control unit 150 controls the GPS unit 180 to receive location data from the GPS satellites at step S330. At this time, the location information generator 152 determines the current location of the mobile terminal using the location data. Next, the control unit 150 determines whether the input video data has reached a size of one frame at step S340. Although it is assumed that the video data are compressed frame by frame, a number of frames to be compressed at a time can be changed depending on the configuration of the mobile terminal. If the input video data has reached a size of a frame, the process proceeds to step S350. Otherwise, the process returns to step S320.

When the input video data has reached the size of a frame, the control unit 150 determines whether the location of the mobile terminal has changed at step S350. In order to determine whether the location of the mobile terminal changes, the GPS module 180 receives the GPS data continuously while the video data are recorded, and the location information generator 152 determines the current location of the mobile terminal. The location information comparator 154 compares the previous location information with the current location information generated by the location information generator 152 and detects the change of location based on the comparison result. If the location of the mobile terminal is changed, i.e. the mobile terminal has moved from one position to another, the location information comparator 154 provides the changed location information to the control unit 150. Accordingly, if the location change is detected, the process proceeds to step S360. Otherwise, the process proceeds to step S370. At step S360, the control unit 150 controls the compressor/decompressor 125 to compress the frame together with the location information provided by the location comparator 154. At step S370, the control unit 150 controls the compressor/decompressor 125 to compress the frame without the location information.

After the frame is compressed with or without the location information, the control unit 150 determines whether a recording stop command is detected at step S380. The recording stop command is generated by a key input through the input unit 160. If the recording stop command is detected, the control unit 150 controls the video input unit 110 to stop capturing the input image and store the motion picture composed of the compressed frames into the storage unit 170 at step S390. Otherwise, if the recording stop command is not detected, the process returns to step S320.

Although not illustrated in FIG. 3, the control unit 150 can control such that an additional field containing data or a link information providing a link to a file is attached to the end of the data field or the location information field of the frame in response to a predefined event such as a user request. For instance, when the user comes across cross-roads or an intersection while recording a motion picture on the move, the control unit 150 can control to add a field containing a supplementary motion picture, a still picture, or other data to the end of the frame on the branched road or the intersection according to the user intention. The supplementary motion picture, still picture, or other data can be provided in the form of link information such that, when a link is selected, the picture or data stored in the mobile phone or downloaded from a network is provided. The supplementary pictures or data are displayed with the motion picture when reproducing the recorded motion picture, thereby helping the user to select a correction direction to progress.

Figure 4B:
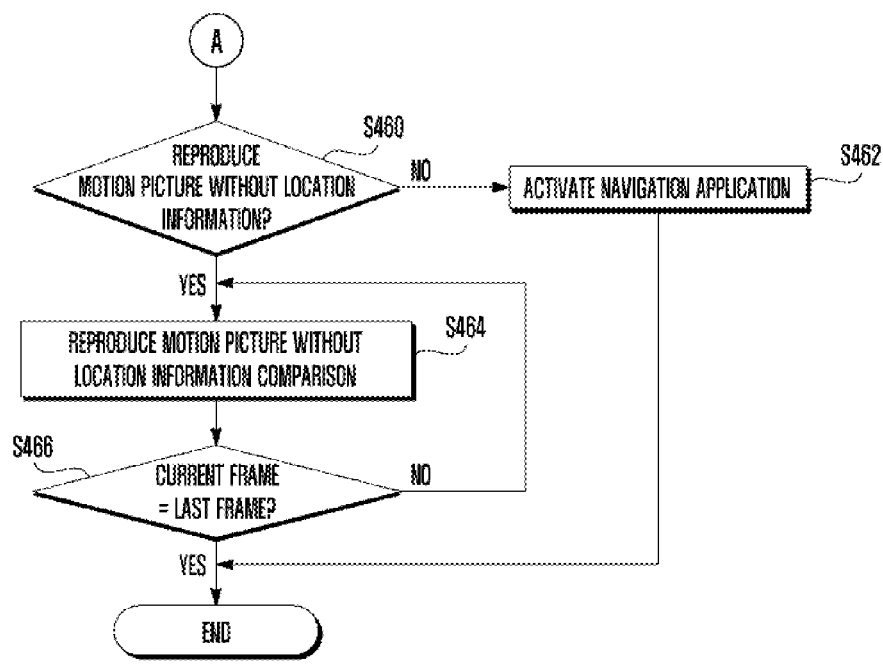

FIGS. 4A and 4B are flowcharts illustrating a method for reproducing a motion picture with location information according to an exemplary embodiment of the present invention.

Referring to FIGS. 4A and 4B, the control unit 150 determines whether a motion picture reproducing command is detected at step S405. When a certain key is input through the input unit 160, the control unit 150 determines the key input as the motion picture reproducing command. If the motion picture reproducing command is detected, the location information generator 152 of the control unit 150 generates the current location information of the mobile terminal using the location data received by the GPS unit 180 and the location information comparator 154 compares the current location information and the recorded location information extracted at the beginning of the motion picture file to be reproduced at step S410. The control unit 150 (i.e. the location information comparator 154) determines whether the current location information and the recorded location information at the beginning of the motion picture are substantially identical with each other at step S415. If the current location information and the recorded location information at the beginning of the motion picture are substantially identical with each other, the process proceeds to step S420. Otherwise, the process proceeds to step S460. When the current location information and the recorded location information extracted at the beginning of the motion picture file are substantially identical with each other, the control unit 150 controls such that the mobile terminal starts reproducing the motion picture at step S420. That is, the control unit 150 decompresses the compressed motion picture file into video frames for the display unit 130 to display the video frames. In a case that the motion picture file includes audio data, the control unit 150 controls the audio data to be processed in synchronization with the video data. For clarity and conciseness, the audio data processing-related operations are omitted. The video frames are reproduced at a preset frame rate as the conventional motion picture reproduction methods.

In a case that the video frame is followed by link information that provides a link to certain data or a file, the control unit 150 controls such that the linked data or file is displayed on the display unit 130 together with the motion picture stream. A frame following the frame displaying the specific data or file can include alert information to alert that the next frame has the link information. In this manner, it is possible to provide the user with advanced information regarding the next situation, e.g. cross-roads. Here, the specific data or file can be enlarged pictures zooming in on selectable options such as progress directions or roads to be selected. When there are lots of selectable options, e.g. branched roads, the information on the selectable options is displayed with a predefined frame prior to the frame having the image of the branched roads. The frame for alerting the selectable options can be set by the user in consideration of an appropriate alert timing and distance to the target frame having the selectable options.

While playing the motion picture, the location information comparator 154 of the control unit 150 compares the current location of the mobile terminal and the location information included in the current frame of the motion picture at step S425 and determines whether the current location information of the mobile terminal and the location information of the current frame of the motion picture are substantially identical with each other at step S430. If the mobile terminal's current location information and the current frame's location information are substantially identical with each other, the control unit 150 determines whether the current frame is the last frame of the motion picture at step S470. If the current frame is the last frame of the motion picture, the control unit 150 ends the reproduction of the motion picture. Otherwise, the process returns to step S420.

In contrast, if the mobile terminal's current location information and the current frame's location information are different from each other at step S430, the process proceeds to step S435. Here, the location information comparison is performed in a tolerance range, e.g. 2 m, in consideration with the error of the location information from GPS satellites.

When the mobile terminal's current location information and the current frame's location information are different from each other at step S430, the control unit 150 stops reproducing the motion picture file and outputs a route deviation alert message at step S435. Here, the outputting of the route deviation alert message can be skipped. In a case that the mobile terminal's current location information and the current frame's location information are different from each other, the control unit 150 stops playing the motion picture file and waits until the locations are substantially identical with each other. If the mobile terminal's current location information and the current frame's location information become substantially identical with each other, the control unit 150 restarts playing of the motion picture file from the frame. Next, the control unit 150 determines a progress direction based on the location information of the motion picture file and displays a progress direction indicator on the display unit 150 at step S440. The progress direction can be informed with one of progress direction indicators stored within the storage unit 170 in the form of Table 1.

TABLE 1

| Progress Direction | Indicator |
|---|---|
| Rightward | ▸ |
| Forward | ↑ |
| Leftward | ↰ |

More particularly, the location information comparator 154 of the control unit 150 determines the progress direction based on the result of comparison between the location information of a reference frame (e.g. the frame at which the motion picture stops due to the route deviation or the frame prior to as much as the tolerance range) and the location information of at least one future frame following the reference frame. Here, the at least one future frame can be a frame having a distance greater than or equal to a number of frames from the reference frame or a series of the frames. The control unit 150 compares the location information of the reference frame and the location information of the future frame, determines whether the location information of the future frame indicates a location positioned left, right or forward in comparison with the location indicated by the location information of the reference frame, selects one of the progress direction indicators from Table 1, and displays the selected progress direction indicator on the display unit 130. Although three progress direction indicators (i.e. rightward, forward, and leftward direction indicators) are listed in Table 1, other progress direction indicators can be included for indicating various progress directions.

Next, the control unit 150 determines whether the mobile terminal is moving at step S445. If the mobile terminal is moving, the location information generator of the control unit 150 generates the location information at the current location and supplies the location information to the location information comparator 154 at step S447. The location information comparator 154 determines whether the current location information is substantially identical with the location information of the current frame of the motion picture at step S450. If the mobile terminal's current location information and the current frame's location information are substantially identical with each other, the control unit 150 restarts playing of the motion picture from the paused frame at step S455 and the process returns to step S425. Otherwise, if the mobile terminal's current location information and the current frame's location information are different from each other, the process returns to step S440. In a case that the paused frame has a link information field providing a link to the specific data or file, the control unit 150 displays the specific data or file on the display unit 130 with the paused frame. The specific data or file can be an enlarged picture zooming in on the progress direction or other information.

If the current location information and the recorded location information at the beginning of the motion picture are different from each other at step S415, the control unit 150 determines whether to start playing of the motion picture without reference to the location information at step S460. Whether to start playing of the motion picture without reference to the location information is determined based on the key input by the user through the input unit 160 in response to a selection request message displayed on the display unit 130. If it is determined to start playing of the motion picture without reference of the location information, the control unit 150 starts playing of the motion picture file without comparing the current location information of the mobile terminal with the location information included in the frames of the motion picture file at step S464. Next, the control unit 150 determines whether the current frame is the last frame of the motion picture file at step S466. If the current frame is the last frame of the motion picture file, the control unit 150 ends the reproduction of the motion picture. Otherwise, the process returns to step S464. If it is determined to start playing of the motion picture file with reference to the location information at step S460, the control unit 150 activates a navigation application to display a map having a start position matched with the start point of the motion picture on the display unit 130 at step S462. Here, the navigation application is a normal navigation application which can search for the route to a destination using the GPS information.

If the mobile terminal is not moving at step S445, the control unit 150 determines whether a navigation application activation command is input for displaying a map indicating the position matched with the location information of the current frame at step S480. The navigation application activation command can be input by selecting a key of the input unit 160 in response to a selection request displayed on the display unit 130. If a navigation application activation command is detected, the control unit 150 activates the navigation application at step S485. Otherwise, the process returns to step S440. At step S485, the control unit 150 activates the navigation application to display a map on the display unit 130 together with the information related to the location information of the current frame of the motion picture file. Although it is depicted that the motion picture file is played correctly when the current location information of the mobile terminal and the location information of the current frame of the motion picture file are substantially identical with each other, the paused motion picture can be played forcibly when the mobile terminal's current location information and the current frame's location information are different from each other.

In another exemplary embodiment of the present invention, when the starting point of the motion picture mismatches with the position of the mobile terminal, it is possible to match the current position of the mobile terminal to the starting point of the motion picture. After matching the starting point of the motion picture with the current position of the mobile terminal, the motion picture can be played as if the mobile terminal moves tracking the locations recorded with the motion picture in consideration of the distance between the location matched with the starting point of the motion picture and the current location.

Figure 5:
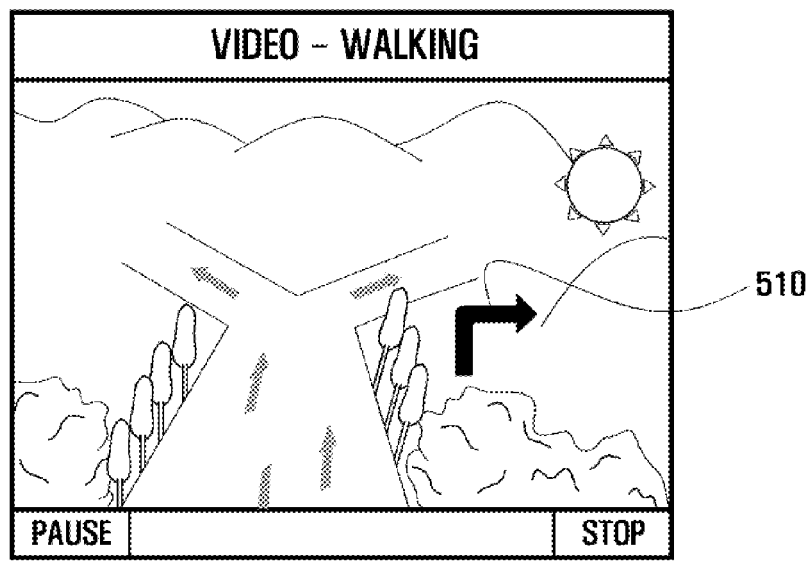
FIG. 5 illustrates a screen image displaying a motion picture recorded with location information according to an exemplary embodiment of the present invention.

FIG. 5 illustrates a screen image displaying a motion picture recorded with location information according to an exemplary embodiment of the present invention. More specifically, FIG. 5 illustrates a frame displayed on the display unit 130 (see FIG. 1) when the motion picture having the location information paused because the mobile terminal has deviated from the route reproduced with the location information of frames composed of the motion picture. In the paused frame, a progress direction indicator 510 is presented. The progress direction indicator 510 is selected by comparing the location information of a reference frame and the location information of a future frame and determining whether the location information of the future frame indicates a location positioned left, right or forward in comparison with the location indicated by the location information of the reference frame. In FIG. 5, the rightward indicator is displayed as an example of the progress direction indicator 510.

Although not illustrated in FIG. 5, the frame of the paused motion picture can include a motion picture or a still picture related to the progress direction can be displayed together with the progress direction indicator 510. By reproducing the motion picture recorded with the location information, the user can track the route on which a user has traveled with the assistance of the motion picture.

As described above, the method and apparatus for recording and reproducing a motion picture with location information according to the present invention is advantageous to track a travel route recorded with the motion picture and location information using the GPS signal received by the GPS module of the mobile terminal. Also, the method and apparatus for recording and reproducing a motion picture with location information according to the present invention is advantageous since the user can track a travel route with the assistance of motion picture recording the travel route with the location information.

While the invention has been shown and described with reference to certain exemplary embodiments thereof, it will be understood by those skilled in the art that various changes in form and details may be made therein without departing from the spirit and scope of the invention, as defined in the appended claims and their equivalents.

What is claimed is:

1. A motion picture recording method of a mobile terminal, the method comprising:
   starting recording of video data in response to a motion picture recording command;
   receiving location data simultaneously with the recording of the video data;
   acquiring location information of the mobile terminal using the location data; and
   generating video frames having at least one of the video data and the location information,
   wherein the generating of the video frames comprises determining, when generating each current frame, whether a location change of the mobile terminal is detected by comparing a current location of the mobile terminal with a previous location of the mobile terminal indicated by location information associated with the most recent video frame comprising the location information, and inserting location information of the changed location into the corresponding current video frame when the current location of the mobile terminal is determined to be different from the previous location of the mobile terminal indicated by the location information associated with the most recent video frame comprising the location information.

2. The method of claim 1, wherein the generating of the video frames comprises attaching the location information at the end of the video data.

3. The method of claim 2, wherein the generating of the video frames comprises inserting auxiliary video information into at least one of the video frames in response to a preset command.

4. The method of claim 3, wherein the auxiliary video information comprises at least one of motion and still pictures related to options selectable in response to a command.

5. The method of claim 1, wherein the generating of the video frames comprises:
   receiving the location data periodically while generating the video frames;
   acquiring the location information of the mobile terminal continuously using the location data.

6. The method of claim 4, wherein the location data are received from Global Positioning System (GPS) satellites.

7. The method of claim 1, wherein the starting of recording of the video data comprises:
   converting light input through a camera lens into a digital video signal; and
   processing the digital video signal in a unit of video frame.

8. The method of claim 2, wherein the video frames are compressed in at least one compression format of Moving Picture Experts Group (MPEG)-1, MPEG-2, MPEG-4, H.263, and H.264.

9. The method of claim 8, further comprising storing the video frames as a motion picture file.

10. A motion picture reproduction method of a mobile terminal, the method comprising:
    acquiring, when a request for reproducing a motion picture is detected, current location information of the mobile terminal using location data;
    retrieving location information included in the motion picture;
    comparing the current location information of the mobile terminal and the retrieved location information; and reproducing, when the current location information of the mobile terminal and the retrieved location information are substantially identical with each other, the motion picture, wherein the reproducing of the motion picture comprises pausing reproduction of the motion picture according to a determination as to whether the current location information of the mobile terminal and the retrieved location information are different from each other.

11. The method of claim 10, wherein the reproducing of the motion picture further comprises:

acquiring the location information of the mobile terminal with the location data received from Global Positioning System (GPS) satellites periodically while reproducing the motion picture;

determining whether current location information of the mobile terminal and the retrieved location information are substantially identical with each other; and displaying a progress direction indicator on the paused motion picture.

12. The method of claim 11, wherein the reproducing of the motion picture comprises displaying auxiliary video information related to selectable options for helping select a direction to progress with the progress direction indicator.

13. The method of claim 11, wherein the progress direction indicator indicates one of forward, rightward, and leftward directions.

14. The method of claim 11, wherein the reproducing of the motion picture comprises maintaining/restarting, when the current location information of the mobile terminal and the retrieved location information are substantially identical with each other, reproduction of the motion picture.

15. The method of claim 11, wherein the pausing of the reproduction of the motion picture comprises activating a navigation application in response to a command.

16. A motion picture recording apparatus for a mobile terminal, the apparatus comprising:

video input unit for inputting video signals through a camera lens;

a Global Positioning System (GPS) unit for receiving location data periodically;

a control unit for controlling recording of a motion picture having the video frames with the location information, the control unit comprising a location information generator for generating the location information of the mobile terminal using the location data received by the GPS unit, and a location information comparator for comparing previous location information of the mobile terminal indicated by location information associated with the most recent video frame comprising the location information and current location information to detect a location change of the mobile terminal; and a motion picture processing unit for generating video frames comprising at least one of the video signals and location information acquired from the location data, wherein the motion picture processing unit, when generating each current frame, inserts location information into the corresponding current video frame when a current location of the mobile terminal is determined to be different from the previous location of the mobile terminal indicated by the location information associated with the most recent video frame comprising the location information.

17. The apparatus of claim 16, wherein the motion picture processing unit attaches the location information at an at least one of the video frames.

18. The apparatus of claim 16, wherein the motion picture processing unit comprises a compressor/decompressor for compressing/decompressing the video frames with the location information.

19. The apparatus of claim 18, wherein the compressor/decompressor compresses the video frames in which no location change of the mobile terminal is detected without location information.

20. The apparatus of claim 19, wherein the compressor/decompressor compresses the video frames in at least one compression format of Moving Picture Experts Group (MPEG)-1, MPEG-2, MPEG-4, H.263, and H.264.

21. The apparatus of claim 16, further comprising a storage unit which stores the video frames as a motion picture file in a compressed format and progress direction indicators in the form of a table.

22. A motion picture reproduction apparatus for a mobile terminal, the apparatus comprising:

a Global Positioning System (GPS) unit for receiving location data periodically;

a control unit for acquiring current location information of the mobile terminal using the location data in response to a command requesting reproduction of a motion picture file, for retrieving location information included in the motion picture file, for comparing the current location information of the mobile terminal and the retrieved location information, for starting reproduction of the motion picture file when the current location information of the mobile terminal and the retrieved location information are substantially identical with each other, and for pausing reproduction of the motion picture, when picture according to a determination as to whether the current location information of the mobile terminal and the retrieved location information are different from each other; and a display unit for displaying video data reproduced from the motion picture file.

23. The apparatus of claim 22, wherein the display unit displays, when the current location information of the mobile terminal and the retrieved location information are different from each other, a progress direction indicator for guiding a direction to progress at the location whether the motion picture has paused.

24. The apparatus of claim 23, wherein the display unit displays auxiliary video information related to selectable options with the progress direction information for helping select a direction to progress with the progress direction information.

25. The apparatus of claim 23, wherein the progress direction indicator indicates one of forward, rightward, and leftward directions.

26. The apparatus of claim 25, wherein the control unit acquires, when a location change of the mobile terminal is detected after the pause of the motion picture, the location information of the mobile terminal after the location change and restarts reproduction of the motion picture.

27. The apparatus of claim 26, wherein the control unit activates a navigation application in response to a command input during pause of the motion picture.

* * * * *